United States Patent Office 3,518,299
Patented June 30, 1970

3,518,299
USE OF FATTY ACID SALTS IN THE SULFOXIDATION PROCESS
Terence G. Alston, Los Angeles, Calif., assignor to Union Oil Company of California, Los Angeles, Calif., a corporation of California
No Drawing. Filed Mar. 3, 1969, Ser. No. 803,993
Int. Cl. C07c 139/04
U.S. Cl. 260—513                                    8 Claims

ABSTRACT OF THE DISCLOSURE

The invention comprises the use of a $C_8$–$C_{25}$ fatty acid salt, e.g., potassium stearate, to promote the activity of sulfur trioxide in the sulfoxidation of paraffin hydrocarbons to alkane sulfonic acids. The process comprises contacting a paraffin with sulfur dioxide, oxygen, sulfur trioxide and a minor amount of the fatty acid salt at temperatures between about 20° and 100° C. and sufficient pressures to maintain liquid phase conditions. The reaction is initiated in the presence of a free radical initiator which can be ultraviolet light, peroxides or azo compounds.

DESCRIPTION OF THE INVENTION

This invention relates to the preparation of alkane sulfonic acids and more particularly is concerned with the preparation of alkane sulfonic acids from normal paraffins by the sulfoxidation reaction with sulfur dioxide and oxygen. The salts of the normal alkane sulfonic acids produced by neutralization of the acids are highly desirable biodegradable surface-active compounds.

Aliphatic and alicyclic sulfonic acids have been prepared by reacting saturated aliphatic and alicyclic hydrocarbons with sulfur dioxide and oxygen in the presence of a free radical initiator. Acetic anhydride has been utilized in the above process to produce a chain reaction which eliminates the dependency of the reaction on a continuous source of free radical initiators. While the resulting reaction is relatively efficient in the production of alkane sulfonic acids, the acetic anhydride is converted to acetic acid which appears as a byproduct in the crude product. Acetic acid and its salts do not possess detergent or surfactant properties, are relatively expensive and are, therefore, generally removed from the crude or neutralized product. This removal is complicated and expensive.

In U.S. Pat. 3,372,188, a process is disclosed whereby formation of the undesired acetate salts is avoided by the use of sulfur trioxide in the sulfonation of saturated aliphatic and alicyclic hydrocarbons. The process described therein is effective, however, the invention disclosed herein of incorporating a fatty acid salt in the reaction medium unexpectedly increases the yields of the alkane sulfonic acid product over that obtained by the process of the aforementioned patent. Furthermore, in the process of the patent, tar is sometimes formed which may create operating problems in commercial plants whereas in the process of this invention, a clear product is obtained without substantial formation of harmful tars.

The primary object of this invention is to improve the effectiveness of sulfur trioxide in the sulfonation of alkane hydrocarbons.

It is another object of this invention to avoid the necessity for use of acetic anhydride in the sulfoxidation process.

It is also an object of this invention to provide a sulfoxidation process that does not continuously consume free radical initiators.

It is another object of this invention to provide a method of preparing a crude product comprising a normal alkane sulfonic acid in admixture with a detergent builder which is formed as byproduct of the reaction.

A still further object of this invention is to provide a method of preparing sulfonic acids which minimizes formation of tar in the process.

Other objects and advantages of this invention will be apparent from the description which follows.

The aforedescribed disadvantages are avoided by the practice of this invention which, briefly, comprises contacting a saturated aliphatic or alicyclic hydrocarbon (referred to herein as paraffin), with sulfur dioxide and oxygen in the presence of sulfur trioxide and fatty acid salt, to be described hereinafter, and initiating the sulfoxidation of the paraffin by introducing a free radical initiator into contact with the reactants. The paraffin is contacted with sulfur dioxide and oxygen in the presence of sulfur trioxide, a $C_8$–$C_{25}$ fatty acid salt and a free radical initiator at a temperature between about 20° and 100° C., preferably between about 30° and 70° C. for over a period of time, e.g., 1–3 hours, sufficient to produce a reaction intermediate. This reaction intermediate is believed to be a persulfonic acid, i.e., $RSO_2OOH$ wherein R is alkyl or cycloalkyl corresponding to the paraffin reactant. The above reaction is then terminated and water, generally in the amount of 10–150% of the paraffin, is then added to the reaction mixture to form the sulfonic acid product. Preferably sulfur dioxide, most preferably in admixture with oxygen is passed through the aqueous mixture at a temperature of 20–100° C. in the above hydrolysis. The pressure employed throughout must be sufficient to maintain liquid phase reaction conditions and can be from 0 to 1,600 p.s.i.g., preferably 0–800 p.s.i.g., depending on the reaction temperature.

The reaction product from the foregoing process contains the alkane sulfonic acid, sulfuric acid and a salt of a $C_8$–$C_{25}$ fatty acid; which upon neutralization with sodium hydroxide forms a highly biodegradable sodium alkyl sulfonate in admixture with sodium sulfate, a commonly used builder in detergents. The sodium sulfate byproduct need not be removed from the reaction mixture since it acts as a builder in detergent compositions, and thus is a useful and desirable ingredient. The salt of the $C_8$–$C_{25}$ fatty acid is normally not removed since the longer chain fatty acid salts are themselves useful detergents and thereby generally add to the effectiveness of the sulfonate.

The paraffins for use in accordance with the practice of this invention include those saturated aliphatic and alicyclic hydrocarbons having between about 5 and about 25 carbon atoms, preferably between about 6 and about 20 atoms. Examples of suitable paraffin hydrocarbons are: hexane, heptane, octane, nonane, decane, undecane, dodecane, tridecane, tetradecane, pentadecane, hexadecane, heptadecane, octadecane, nonadecane, eicosane, heneicosane, docosane, tricosane, tetracosane, pentacosane, cyclohexane, cycloheptane, cyclodecane, and cyclododecane, etc., and their isomers. Preferably, to avoid spurious side reactions, the paraffin is employed substantially free of olefins and aromatics. Straight chain paraffins, e.g., normal octane, undecane, etc., are preferred since non-biodegradable detergents are sometimes produced from the branched chain paraffins. A suitable source of straight chain paraffins in sufficient purity can be obtained by contacting a paraffin stock with a molecular sieve having a uniform pore size from 5 to about 10 A. as a selective adsorbent to adsorb the straight chain paraffin. The latter is thereafter recovered by desorption of the sieve in a conventional manner. Suitable separation processes involving molecular sieves of this nature are described more particularly in U.S. Pats. 2,921,026, 2,935,467 and 2,030,864.

The fatty acid salts that are suitable to promote the reaction include the salts of fatty acids having from about 8 to about 25 carbons, preferably from 12 to about 22 carbons. Salts of suitable acids include the salts of octanoic, decanoic, undecanoic, lauric, tridecanoic, myristic, pentadecanoic, palmitic, heptadecanoic, stearic, nonadecanoic, eicosanoic, heneicosanoic, docosanoic, tricosanoic, tetracosanoic, and pentacosanoic and their isomers. Salts of the straight-chain acids are preferred to those of the branched-chain acids since the straight-chain sulfonates are generally preferred over branched-chain sulfonates for the contemplated end uses, e.g., detergents and surfactants. Alkali metal, alkaline earth metal or ammonium salts of the aforementioned acids can be used, e.g., sodium, potassium or lithium, calcium, magnesium, or ammonium. The alkali metal salts, preferably sodium and potassium, are preferred cations for use herein. The fatty acid salts are preferably employed in minor amounts, e.g., 0.01–20 weight percent, most preferably 2–10 weight percent of the paraffin reactant, but may be employed in larger amounts, e.g., 30–200 weight percent of the paraffin reactant.

Because the monosubstituted sulfonic acids of the normal paraffins are more desirable as detergents than the di- or poly-substituted acids it is preferred to operate the process to produce a maximum of monosulfonic acid. This is achieved by limiting the degree of conversion to react only a portion of the paraffins, usually 10% to 50%, and preferably 15% to 30% by weight. This may be achieved by performing the reaction in the presence of an amount of paraffin in excess (10–300 mol percent) of the stoichiometric equivalent of the sulfur dioxide and oxygen reactants. The unreacted paraffin may then be recycled to the reaction.

The reaction may be initiated by any of the well-known free radical producing compounds or procedures. Free radical initiators for use in accordance with the practice of this invention include, but need not be restricted to, the following examples: ultra violet light; gamma irradiation; peroxides, e.g., acetyl peroxide, hydrogen peroxide; metal alkyls, e.g., dimethylzinc; aliphatic diazo compounds, e.g., diazoacetic ester; inorganic azo compounds, e.g., potassium azodisulfonate; metal ketyls, e.g., sodium and potassium derivatives of benzophenone and fluorenone; N-nitroacetanilide; and hexaarylethanes, e.g., hexaphenylethane. The preferred imitator for use herein is 2,2'-azobisisobutyronitrile.

The introduction of sulfur dioxide, oxygen and sulfur trioxide into contact with the paraffin may be accomplished by procedures already known in the art, e.g., batch or continuous contacting. The reactants can suitably be sparged into contact with the hydrocarbon which can be maintained as a liquid pool in the reaction vessel or the paraffin and gaseous reactants can be simultaneously admixed and introduced into the reactor, and product simultaneously withdrawn therefrom to provide a continuous process. The relative weight ratio of sulfur dioxide to oxygen will usually vary between 1.2:1 and 10:1, and preferably between 2:1 and 7:1. The invention is not limited to the use of pure oxygen since air and admixtures of oxygen and inert gases such as nitrogen, carbon dioxide, etc., can be used.

The relative weight ratio of sulfur trioxide to paraffin may vary between 0.005 and 10.0, and preferably between about 0.08 and about 4.0. Sulfur trioxide is preferably introduced as a vapor to avoid any danger of carbonization and charring of the reaction product which may result from introduction of liquid sulfur trioxide. Introduction of the sulfur trioxide into the mixture may be accomplished by passing a substantially dry stream of sulfur dioxide and oxygen previously described over or through liquid sulfur trioxide, prior to its contacting with the hydrocarbon to thereby saturate this vapor mixture with sulfur trioxide. Alternatively, the sulfur trioxide may be independently introduced as a separate vapor stream, preferably in admixture with an inert gas such as nitrogen.

The following examples in part illustrate a procedure for carrying out the above-described invention, but are not intended to be limiting in scope.

EXAMPLE I

The following example illustrates a mode of operation of the invention. Into a 500-milliliter, 3-necked borosilicate glass flask fitted with a reflux condenser, an agitator, a thermometer, and a gas-inlet tube were placed 250 milliliters of normal hexadecane, 4.0 grams of 2,2'-azobisisobutyronitrile and 8.0 grams of potassium stearate. The mixture was heated in a water bath to between 70° and 80° C., and a dry gaseous mixture of 0.8 cu. ft./hr. of sulfur dioxide and 0.4 cu. ft./hr. of oxygen was passed into the agitated mixture over a period of 30 minutes. Sulfur trioxide vapor was then fed into the above gaseous sulfur dioxide/oxygen mixture at a rate of about 4.5 grams/hr. and the reaction medium was maintained at 40°–60° C. for about 4 hours. Thereafter the contacting was discontinued and 100 milliliters of water were added. The mixture was again heated to 70°–75° C. for 30 minutes while sulfur dioxide and oxygen were continuously passed therethrough. The mixture was then steam distilled to remove dissolved sulfur dioxide. Unreacted hexadecane was removed by solvent extraction leaving a liquid substantially free of tars and which by analysis was found to contain 39.1 grams of hexadecyl sulfonic acid and 17.8 grams of sulfuric acid. The conversion of hexadecane was 14.9%.

EXAMPLE II

The following example illustrates results obtained when addition of a fatty acid salt is omitted. Into the flask described in Example I were placed 250 milliliters of normal dodecane and 0.3 gram of 2,2'-azobisisobutyronitrile. The mixture was heated in a water bath to between 70° and 80° C., and a dry gaseous mixture of 0.8 cu. ft./hr. of sulfur dioxide, 0.4 cu. ft./hr. of oxygen, and 6.6 grams/hr. of sulfur trioxide was passed into the agitated mixture over a period of 15 minutes. The mixture was then cooled to 46° C. while continuing to introduce the gaseous mixture. The reaction temperature was maintained at between 44° and 52° C. for an additional 45 minutes with occasional cooling. The contacting was discontinued and 100 milliters of water added. The mixture was again heated to 70°–75° C. for 15 minutes while sulfur dioxide and oxygen were continuously passed therethrough. The mixture was then refluxed to remove dissolved sulfur dioxide. Unreacted dodecane was removed by solvent extraction leaving a brown liquid which by analysis contained 19.8 grams of dodecyl sulfonic acid and 6.1 grams of sulfuric acid. The yield of 19.8 grams of dodecyl sulfonic acid compares unfavorably with the 39.1 gram yield of hexadecyl sulfonic acid in Example I wherein potassium stearate was incorporated in the reaction medium.

EXAMPLE III

This example illustrates the results obtained when the fatty acid salt of Example I is replaced by a fatty acid. To the above-described flask were added 240 milliliters of normal hexadecane, 6.0 grams of 2,2'-azobisisobutyronitrile and 9.0 grams of myristic acid. The mixture was heated in a water bath at about 70° F. and a dry mixture of 0.8 ft./hr. of sulfur dioxide and 0.4 cu. ft./hr. of oxygen was passed into the agitated mixture for about 3½ hours. Sulfur trioxide vapor was then fed into the gaseous mixture at a rate of about 6.0 grams/hr. for about 2 hours while the reaction medium was maintained at about 70° C. The contacting was discontinued and 100 milliliters of water were added and contacting with sulfur dioxide and water continued as in Example I. Sulfur dioxide and unreacted paraffin were removed as in Example I, leaving a brown liquid which by analysis was found to contain 18.4 grams of hexadecyl sulfonic acid and 13.5 grams of sulfuric acid, a yield substantially lower than that obtained in Example I wherein potassium stearate was added.

Other paraffins and fatty acid salts described hereinabove may be substituted for hexadecane and potassium stearate in Example I without departing from the preferred mode of practice illustrated therein. It is hence not intended to limit the invention to the details of the example or to the details of the disclosure but only broadly to that defined in the following claims:

I claim:

1. In the free radical initiated sulfoxidation wherein an alkane or cycloalkane having between about 5 and about 25 carbons is contacted with sulfur dioxide and oxygen in a reaction zone at a temperature between about 20° and 100° C. and sufficient pressure to maintain liquid phase conditions and wherein said sulfoxidation is initiated by introduction into said reaction zone of free radicals, the improvement which comprises introducing sulfur trioxide in an amount comprising between 0.005 and 10.0 parts by weight per weight part of said reacted alkane or cycloalkane and 0.01–20 weight percent of an alkali metal, alkaline earth metal or ammonium salt of a fatty acid having between about 8 and 25 carbons into said reaction zone to contact with said alkane or cycloalkane, sulfur dioxide and oxygen.

2. In the process of claim 1 wherein the sulfur trioxide is introduced as a vapor.

3. In the process of claim 2 wherein said alkane or cycloalkane is a normal alkane and contains between about 6 and about 20 carbon atoms.

4. In the process of claim 1 wherein the fatty acid salt is a salt of an alkali metal.

5. In the process of claim 4 wherein the alkali metal is potassium or sodium.

6. In the process of claim 1 wherein the fatty acid salt has between 12 and 22 carbons.

7. In the process of claim 3 wherein the fatty acid salt is an alkali metal salt of a normal fatty acid having from about 12 to 22 carbons.

8. In the process of claim 1 wherein said alkane or cycloalkane is hexadecane and said fatty acid salt is potassium stearate.

References Cited

UNITED STATES PATENTS 3,372,188   3/1968   Alston et al. _____ 260—513

DANIEL D. HORWITZ, Primary Examiner

U.S. Cl. X.R.

260—503